J. WINKLER.
BOTTLE.
APPLICATION FILED FEB. 27, 1912.
1,060,052.
Patented Apr. 29, 1913.
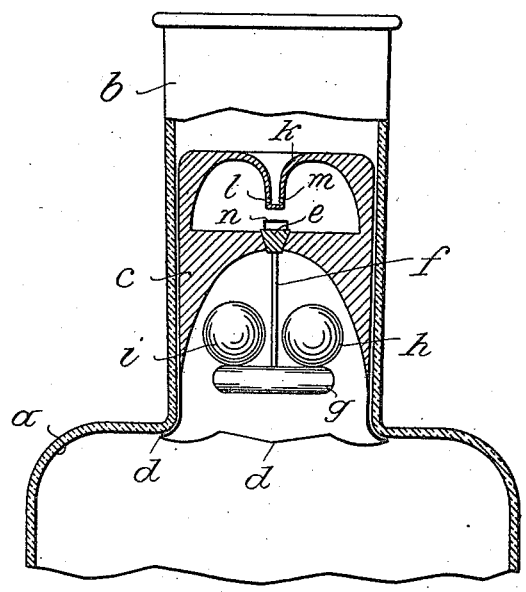
Witnesses.
Inventor.
Jos. Winkler

UNITED STATES PATENT OFFICE.

JOSEPH WINKLER, OF NEUBURG, GERMANY.

BOTTLE.

1,060,052.   Specification of Letters Patent.   Patented Apr. 29, 1913.

Application filed February 27, 1912. Serial No. 680,206.

*To all whom it may concern:*

Be it known that I, JOSEPH WINKLER, a subject of the German Emperor, residing at Neuburg, in the German Empire, have invented a new and useful Improvement in Bottles Which After Having Been Once Emptied Cannot be Again Filled, of which the following is a specification.

The present invention relates to a bottle, which after having been once emptied cannot be again filled.

The invention consists in that a part fitted into the neck of the bottle carries a valve, which is loaded in a downward direction by freely rolling balls, while above the valve is arranged a funnel, the closed bottom of which limits the stroke of the valve and the walls of which have outlets arranged diametrically opposite to each other and closed by a raised flange of the valve when the bottle is placed on its head for the purpose of being fraudulently refilled.

In the accompanying drawing the present invention is exemplified in a constructional form shown in cross section.

$a$ is the bottle and $b$ is its conical neck, into which the inset-part $c$ having a correspondingly conical shape is fitted and which is made of aluminium or any other suitable material. The lower edge of this inset-part is made in shape of elastic tongues $d$, which catch in the manner shown against the inside of the bottle, so that it is impossible to remove the inset-part $c$ from the bottle.

$e$ is a valve, to which is attached by means of a rod $f$, a disk $g$ made of aluminium, cork, ebonite or the like. This disk carries the balls $h, i$, rolling freely on it and made of glass or the like.

$k$ is a funnel the closed bottom of which limits the stroke of the valve $e$.

$l$ and $m$ are outlet-holes in the walls of the funnel $k$ and arranged diametrically opposite to each other.

$n$ is a raised flange provided on the top of the valve $e$.

The here described constructional form acts in the following manner: After the bottle has been filled the inset-part $c$ is introduced into the neck until the tongues $d$ have engaged behind the lower end of the neck so that inset and bottle are unseparably joined to each other. If now the bottle is inclined for pouring out the contents the valve $e$ will rise from its seat and the liquid can escape. After the bottle has been emptied, the liquid will be prevented from entering the bottle, as long as the bottle is standing upright. If it is attempted to refill the bottle in a horizontal position, this will be likewise found to be impossible, as the freely rolling balls $h, i$ will press against the disk $g$ also when the bottle is in a horizontal position, so that the valve $e$ will remain closed.

The possibility may be considered of attempting to refill the bottle by lifting the valve by means of a pair of tweezers or the like or by turning the bottle upside down and forcing the liquid under pressure into it. But also these attempts will be frustrated by the bottle according to the present invention. As the holes $l, m$ namely are arranged diametrically opposite to each other and they are not directed toward the valve but in quite different directions, an attempt to introduce a tweezers or the like for lifting the valve will be in vain. If, however, the bottle is turned upside down, the valve $e$ falls over the bottom of the funnel $k$ and closes the holes $l, m$ by means of its raised rim $n$, so that then the entrance of the liquid is entirely prevented.

I claim:

A bottle having an inset inseparably fitted in the neck, a valve in said inset, consisting of a valve body and a rod extending downwardly therefrom, the end of said rod carrying a disk having balls thereon, a funnel above said valve formed by said inset, the bottom of said funnel being closed and adapted to limit the stroke of the valve, holes in the walls of said funnel diametrically opposite each other, the valve body having a raised flange adapted to close the said holes in the funnel when the bottle is turned upside down.

In testimony whereof I have affixed my signature in presence of two witnesses.

JOSEPH WINKLER.

Witnesses:
 JULIUS WINSL,
 FILBRVOK JANNICH.

Copies of this patent may be obtained for five cents each, by addressing the "Commissioner of Patents, Washington, D. C."